United States Patent [19]
Canfield et al.

[11] Patent Number: 4,987,493
[45] Date of Patent: Jan. 22, 1991

[54] MEMORY EFFICIENT INTERLACE APPARATUS AND METHOD AS FOR A PICTURE IN A PICTURE DISPLAY

[75] Inventors: Barth A. Canfield, Indianapolis, Ind.; Russell T. Fling, Naperville, Ill.; Donald H. Willis, Indianapolis, Ind.

[73] Assignee: RCA Licensing Corporation, Princeton, N.J.

[21] Appl. No.: 387,745

[22] Filed: Aug. 1, 1989

[51] Int. Cl.$^5$ .................. H04N 5/262; H04N 5/450
[52] U.S. Cl. .................................. 358/183; 358/22
[58] Field of Search ............ 358/183, 22, 160, 133, 358/136

[56] References Cited

U.S. PATENT DOCUMENTS

| | | | |
|---|---|---|---|
| 4,249,213 | 2/1981 | Imaide et al. | 358/183 |
| 4,267,560 | 5/1981 | Ishikawa et al. | 358/22 |
| 4,623,915 | 11/1986 | Bolger | 358/22 |
| 4,656,516 | 4/1987 | Fling | 358/183 |
| 4,712,130 | 12/1987 | Casey | 358/22 |
| 4,724,487 | 2/1988 | Casey | 358/183 |
| 4,729,028 | 3/1988 | Mick et al. | 358/183 |
| 4,750,038 | 6/1988 | Welles et al. | 358/183 |
| 4,750,039 | 6/1988 | Willis | 358/183 |
| 4,761,686 | 8/1988 | Willis | 358/160 |
| 4,777,531 | 10/1988 | Hakamada et al. | 358/183 |
| 4,796,089 | 1/1989 | Imai et al. | 358/22 |
| 4,811,103 | 3/1989 | Casey | 358/22 |
| 4,837,626 | 6/1989 | Nishiyama et al. | 358/183 |
| 4,839,728 | 6/1989 | Casey | 358/22 |
| 4,862,269 | 8/1989 | Sonoda et al. | 358/183 |
| 4,918,518 | 4/1990 | Phillips | 358/183 |

FOREIGN PATENT DOCUMENTS 2187360 9/1987 United Kingdom .

Primary Examiner—Howard W. Britton
Assistant Examiner—Michael Lee
Attorney, Agent, or Firm—Joseph S. Tripoli; Eric P. Herrmann; James B. Hayes

[57] ABSTRACT

A picture-in-a-picture television receiver includes a memory for holding samples representing a vertically and horizontally compressed image. The memory is divided into three parts, a main portion which holds one field of the compressed image and first and second crossover buffers, each of which hold one line of the compressed signal. Both upper and lower field types may be derived from each field of the auxiliary signal used to produce the compressed image. Sample values are stored into the memory such that an upper field of the compressed image is stored when an upper field of the main image is displayed and a lower field is stored when a lower field is displayed. When the address used to read samples from the memory overtakes the address used to write samples into the memory, the type of field derived from the auxiliary signal is switched and one line of samples is directed to one of the crossover buffers. During this time, the read address is changed to read samples from the other one of the crossover buffer. This apparatus reduces distortion in the compressed image caused by field misalignment between the main and auxiliary signals.

9 Claims, 6 Drawing Sheets

UPPER FIELD

LOWER FIELD

MEMORY ADDRESS GENERATOR 434

FIG. 6 FIELD TYPE SELECTOR 510

MEMORY EFFICIENT INTERLACE APPARATUS AND METHOD AS FOR A PICTURE IN A PICTURE DISPLAY

BACKGROUND OF THE INVENTION

The present invention relates to a method for concurrently displaying two video images derived from respective asynchronous sources and to memory efficient circuitry for implementing the method.

In a television receiver having picture-in-a-picture (pix-in-pix) capability, a small video image derived from an auxiliary source is displayed as an inset in a full size image derived from a main source. The main and auxiliary sources may be, for example, two independent broadcast television signals. Since these signals are independent, they are likely to be asynchronous. That is to say, there may be phase and frequency differences in the horizontal line timing and vertical field timing of the two signals as well as in their chrominance subcarrier signals.

These timing differences between the main and auxiliary signal may cause distortions in the auxiliary image when it is displayed using timing signals derived from the main image. Image distortion caused by the different chrominance signal phases appear as erroneous or changing colors in the reproduced image. This type of distortion is generally overcome by independently demodulating the chrominance signal components of the main and auxiliary video signals. Distortion caused by the different horizontal line and vertical field scanning signal phases may be overcome by sampling the auxiliary signal in synchronism with timing signals for the auxiliary image and then displaying the stored samples in synchronism with timing signals for the main image.

A particular type of distortion which is of interest in this application occurs when the field scanning signals of the main and auxiliary video signals are not aligned. FIGS. 1a through 1c illustrate this type of distortion. FIG. 1a represents a video image of a diamond-shaped form as reproduced on a conventional interlace scan display. In an interlace scan display, each frame of an image is composed of two time-sequential interlaced field images, an upper field image and a lower field image. In FIG. 1a, the circles represent pixels of an upper field and the crosses represent pixels of a lower field. The terms "upper" and "lower" are used to describe the two fields to emphasize that, for proper reconstruction of the image, each line of the lower field should be displayed below a corresponding line of the upper field. In FIG. 1a, the upper field line numbers all have a suffix of U and the lower field line numbers all have a suffix of L.

FIG. 1b represents a vertical compression of the image shown in FIG. 1a in a ratio of three to one. In a conventional pix-in-pix system, the inset image is compressed both horizontally and vertically. However, to avoid unnecessary confusion, the images shown in FIGS. 1b, 1c and 3 are only vertically compressed. The image shown in FIG. 1b represents a vertical compression of the image when two small picture fields are stored in a memory and displayed in proper alignment with the main picture. That is to say, when the upper and lower fields of the compressed auxiliary image are displayed as parts of the upper and lower fields of the main image, respectively.

If the memory includes storage space for only one field of video samples, an image such as that shown in FIG. 1b is produced only when the vertical field synchronizing signals components of the two signals are properly aligned. In this alignment, one complete field of the auxiliary signal is received and stored before the small picture is displayed and the stored field is of the same type (upper or lower) as the displayed main field. More commonly, the main and auxiliary signals are aligned such that, when the compressed image is displayed, the stored auxiliary signal includes portions of two successive fields, one upper field and one lower field. This image may be distorted because, in a portion of the image, the relative positions of the upper and lower fields are reversed.

An misalignment of this type occurs when the compressed auxiliary image is being read from the memory for display at the same time that new data, to be displayed in the next field period, is being written into the memory. If, for example, the read-write overlap for the memory occurs at line 5 of the auxiliary image, as indicated by the broken line in FIG. 1a, a distorted compressed image, such as that shown in FIG. 1c may be produced. In this image, the lower field lines 7, 10, 13 and 16 are erroneously displayed in positions above the upper field lines 6, 9, 12 and 15, distorting the lower portion of the compressed image.

SUMMARY OF THE INVENTION

The present invention is embodied in a video signal storage system having a storage element capable of holding more than one field interval but less than one frame interval of an auxiliary signal. This storage element is organized as a main buffer having sufficient storage to hold one field interval of the auxiliary signal and a crossover buffer having sufficient storage to hold less than one field interval of the auxiliary signal. The system includes processing circuitry that writes data into the storage element as it is received and reads data from the storage element synchronous with a further video signal. The system includes circuitry which monitors the data being written into and read from the main buffer storage unit. When an overlap is detected between the data being written and the data being read, the monitoring circuitry conditions the processing circuitry to direct a portion of the processed data to the crossover buffer.

BRIEF DESCRIPTION OF THE DRAWINGS

FIGS. 1a, 1b and 1c, referenced above, are graphical depictions of raster scanned images that are useful for describing the present invention.

DETAILED DESCRIPTION

The present invention is described in the context of digital circuitry which implements a pix-in-pix feature for a consumer television receiver. It is contemplated, however, that this invention may have broader application. It may be used, for example, in other systems where two images are displayed concurrently and it may employ analog circuitry such as charge-coupled devices in place of the digital memory circuitry.

THEORY OF OPERATION

In a pix-in-pix display, a vertically and horizontally compressed image derived from an auxiliary source, such as a first broadcast television signal, is displayed inset in a full-size image derived from a main source, such as a second broadcast television signal. As set forth above, if the pix-in-pix system stores only one field of the compressed video signal, the inset image may be distorted due to phase and frequency differences between the vertical field synchronizing signal components of the main and auxiliary signals.

This type of distortion may be considered to have two components. A first component relates to the relative field types of the main and auxiliary signals. Even if the vertical field synchronization signals of the two signals are properly aligned, the reproduced compressed image may be distorted, if upper and lower fields of the compressed image are displayed during respective lower and upper field intervals of the main image. To overcome this type of signal misalignment, the circuitry described below in reference to FIGS. 4–7 is able to produce signals representing compressed upper or lower field lines from each field of the auxiliary signal. This may be considered to be generating two vertically subsampled signals from the field using two distinct subsampling phases, respectively.

Figure 2:
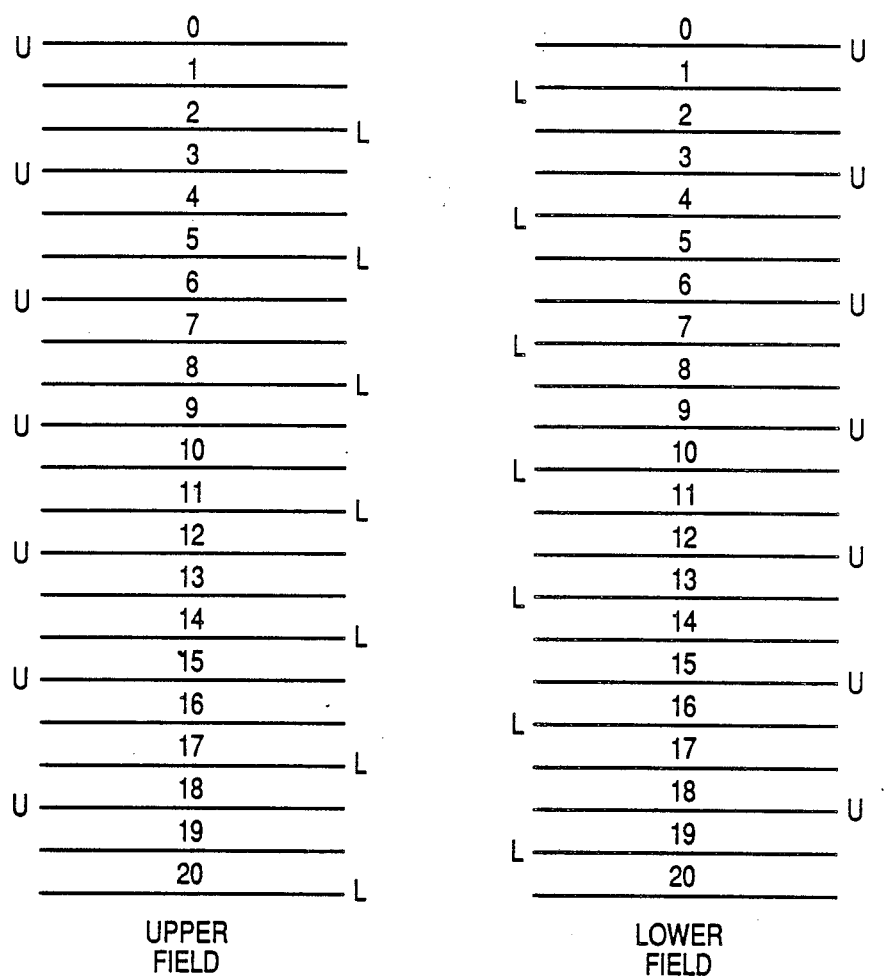
FIG. 2 is a graphical depiction of raster scan lines that is useful for describing the operation of an embodiment of the present invention.

FIG. 2 illustrates how these signals are generated. FIG. 2 includes two scan-line diagrams which illustrate respective upper and lower fields of a full size auxiliary image. In each of these diagrams, lines marked with the letter U are selected in the subsampling process for an upper field, and lines marked with the letter L are selected for a lower field of the compressed image. Thus, if an upper field of the auxiliary image is received and is to be stored in the memory as a lower field for display in a lower field of the main image, lines 2, 5, 8, 11, 14, 17 and 20 are selected by the subsampling circuitry. If a lower field is received and an upper field is to be stored, lines 0, 3, 6, 9, 12, 15 and 18 are stored.

If a line number in the compressed image is represented by the letter N, the following table illustrates all of the possible transformations between received input field types and displayed output field types. In this table, the expression "3N" indicates a line number in the full size auxiliary image that is three times the corresponding line number in the compressed image.

TABLE

| Output Field Type | Input Field Type | |
|---|---|---|
|  | Lower | Upper |
| Upper | 3N | 3N |
| Lower | 3N + 1 | 3N + 2 |

This table assumes that the line numbers selected to produce an upper field line in the output image remain fixed from field to field and that the line numbers selected to generate the lower fields change. An alternative scheme for selecting lines from the main image would be to keep the lower field line numbers fixed and to change the line numbers used to generate the upper field image from field to field of the input signal.

Figures 1A, 1B, 1C:
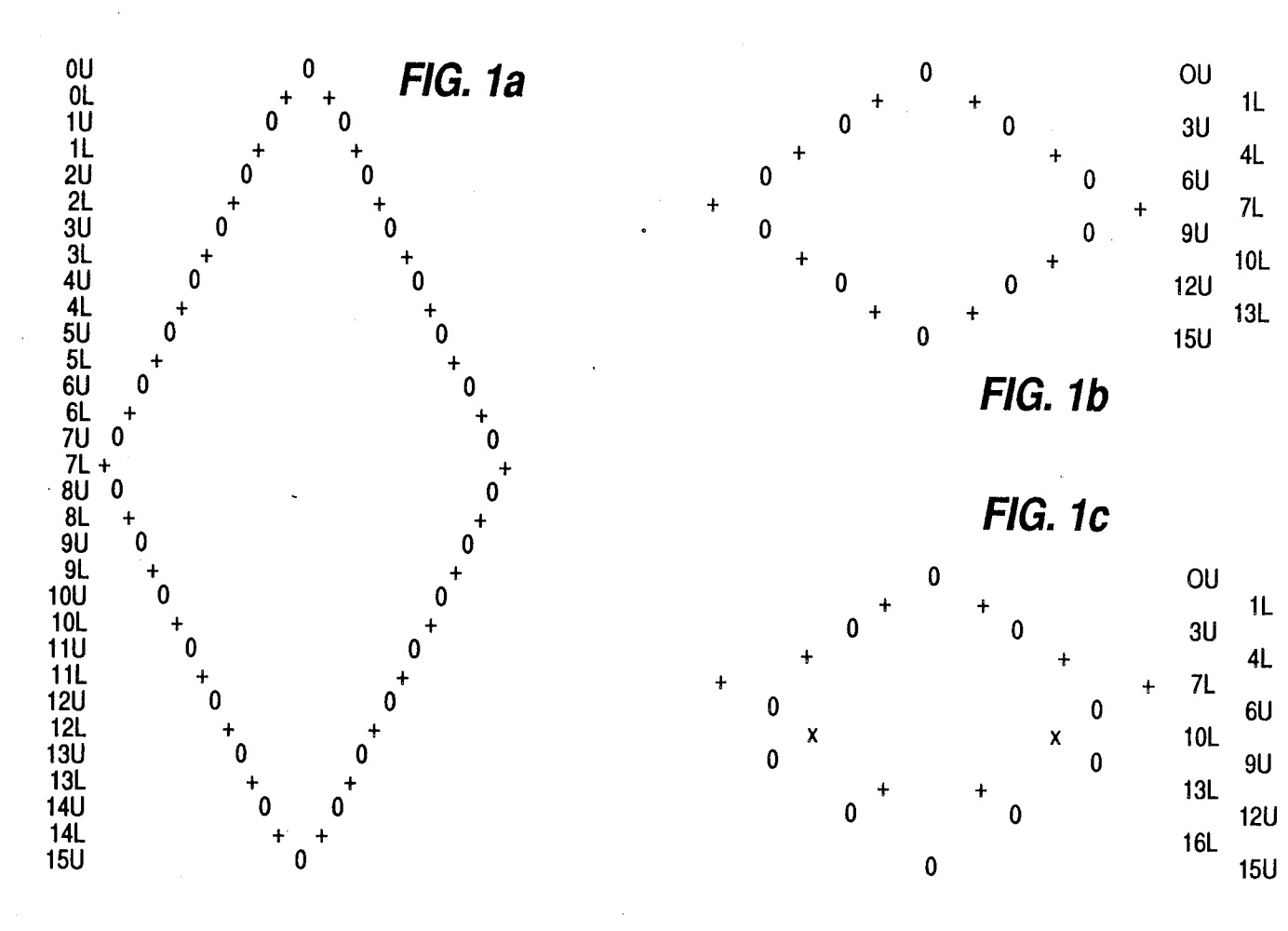

A second component of this type of distortion is a misalignment of the field synchronization scanning signal components of the main and auxiliary video signals which results in a single field containing lines of two different field types. This problem is illustrated in FIG. 1c. The two columns of numbers immediately to the right of FIG. 1c illustrate the lines of the full size auxiliary image fields that were selected to generate the vertically compressed image As shown in FIG. 1c, the first two lines of the first field are upper field lines and the last four lines are lower field lines. The opposite conditions occur for the second displayed field. This difference in displayed field type occurs when there is a crossover between the read and write addresses used for the compressed image field memory.

Figure 3:
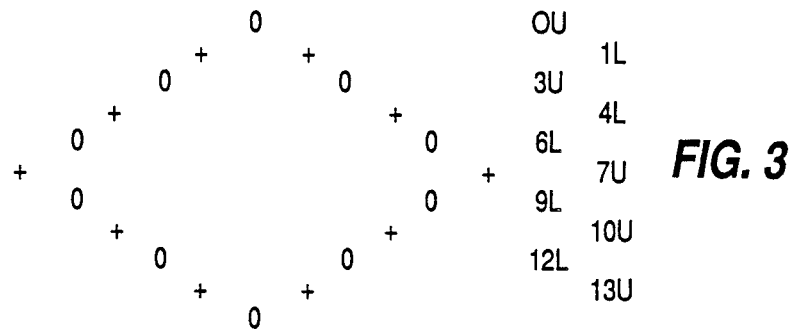
FIG. 3 is a graphical depiction of a raster scanned image that is useful for describing the operation of an embodiment of the present invention.

The apparatus described below detects when a crossover occurs and automatically switches field types generated from a given incoming field to reduce distortion in the compressed image. The result of a switch of this type is illustrated in FIG. 3. In FIG. 3, the first two lines of the outgoing upper field are derived from an incoming upper field, and the last three lines of the outgoing upper field are derived from an incoming lower field of the auxiliary signal. However, all of these lines are intended to be displayed as upper field lines as indicated by the letters in the margins of the scan line diagrams of FIG. 2. Using the same technique, all lines of the outgoing lower field are intended to be displayed as lower field lines even though they are derived partly from an incoming lower field and partly from an incoming upper field of the auxiliary signal.

When a crossover occurs in the read and write addresses used to access the compressed field memory, it is possible that a single displayed line will include samples of lines from two incoming fields having different field types. For example, if the crossover occurs in the middle of a line, the first half of the displayed line may be from an upper field line, e.g. line 0, while the second half of the displayed line may be from a lower field line, e.g. line 1. Data written into the remainder of the field memory is displayed as a part of the next field of the auxiliary image to be displayed.

A crossover of this type may produce a noticeable discontinuity in the displayed line in which it occurs because the portions of the image displayed in the two parts of the line have different vertical displacements. In addition, the different parts of the line may have different chrominance signal phases which may result in a bright sparkle at the discontinuity. This discontinuity appears in substantially the same location in the reproduced image for each displayed frame.

To overcome this problem, the apparatus described below partitions the memory into a main field storage area and two crossover buffer areas. During line intervals in which crossover events occur, the circuitry described below effectively routes the pixel data for the crossover line to one or the other of these crossover buffers.

In the present embodiment of the invention, this routing is performed by memory address generation circuitry. When a field of an image is displayed, a crossover event, if it occurs, is detected and the memory address corresponding to the start of the horizontal line interval in which the crossover occurs is saved. The next time data is to be written into the memory cells corresponding to the saved line address, it is written instead, to a first one of the crossover buffers. During the next field interval, signals representing the crossover line are written into the second crossover buffer while data is read from the first crossover buffer. For all subsequent fields, the two buffers are alternated to avoid conflicts between the reading and writing of the compressed video signal.

Although, in this embodiment of the invention, the crossover buffers are in the same physical memory element as the field memory, it is contemplated that separate memory elements may be used for the field memory and each of the crossover buffers. Moreover, it is contemplated that a system of the type described above may be implemented using only one crossover buffer. In this alternative system, the line in the field memory and the crossover buffer would alternately be used for writing and reading data from the horizontal line interval in which the crossover occurs.

DESCRIPTION OF THE EXEMPLARY EMBODIMENT

In the drawings, broad arrows represent signal paths for conveying multi-bit signals. Line arrows represent connections for conveying analog signals or single-bit digital signals. Depending on the processing speed of the devices, compensating delays may be required in certain of the signal paths. One skilled in the art of digital signal processing circuit design will know where such delays are needed in a particular system.

Figure 4:
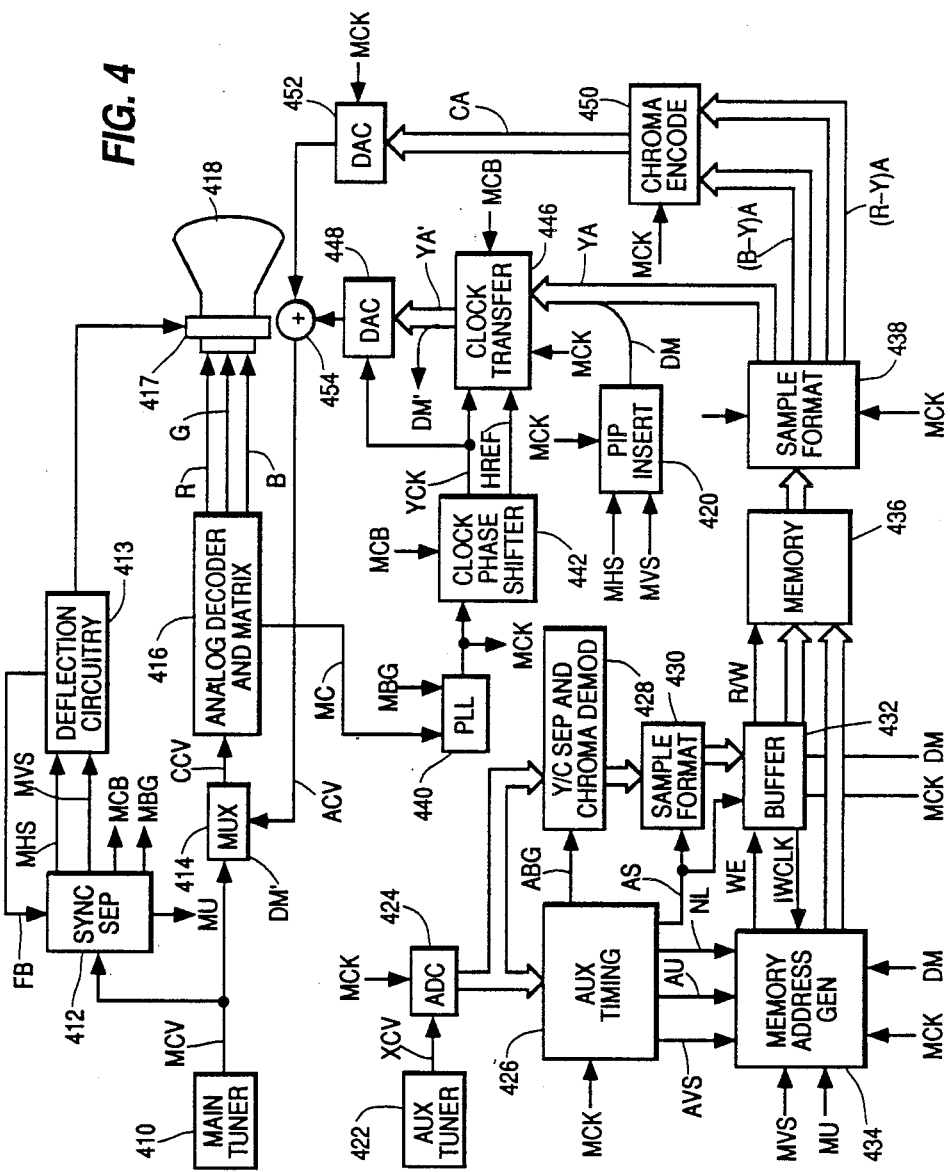
FIG. 4 is a block diagram of a television receiver which includes an embodiment of the present invention.

FIG. 4 is a block diagram of a television receiver having a pix-in-pix feature which includes an embodiment of the present invention. In FIG. 4, a composite main television signal, MCV, provided by a main tuner 410 is applied to conventional synchronization signal separation circuitry 412. The circuitry 412 generates signals MHS and MVS representing, respectively, the horizontal line and vertical field synchronizing signal components of the signal MCV. The circuitry 412 also provides a main composite blanking signal, MCB, a main burst-gate signal, MBG, and a signal MU which indicates when the signal MCV is the upper field of an image.

The signal MCV is also applied to one input terminal of a multiplexer 414. Another input terminal of the multiplexer 414 is coupled to receive a composite video signal ACV representing a compressed auxiliary image. The multiplexer 414 is controlled by a signal, DM', provided by pix-in-pix insertion circuitry 420 and clock transfer circuitry 446 to substitute the signal ACV for the signal MCV in a portion of each field, when the signal DM' is logic-zero. The output signal of the multiplexer 414 is a compound composite video signal, CCV, representing the main image with an inset auxiliary image. The circuitry which generates the signal ACV is described below in reference to FIGS. 4 through 7.

The pix-in-pix insertion circuitry 420 is responsive to the main horizontal and vertical synchronizing signals, MVS and MHS, and the system clock to generate the signal DM. In the present embodiment of the invention, the compressed auxiliary image is displayed during 69 successive line intervals in each field of the main signal. Each displayed compressed line occupies approximately one-quarter of the corresponding main signal horizontal line interval.

The output terminal of the multiplexer 414 is coupled to conventional analog decoder and matrix circuitry 416 which, for example, separates the luminance and chrominance signal components of the signal CCV, demodulates the chrominance signal component into quadrature phase related color difference signal components and generates, from the luminance and color difference signals, red (R), green (G) and blue (B) primary color signals for application to a cathode-ray tube (CRT) 418. The image represented by the signal CCV is reproduced on the CRT 418.

An auxiliary composite video signal, XCV, from which the signal ACV is generated, is provided by a conventional television tuner 422. The signal XCV is applied to an analog-to-digital converter 424 which is clocked by a sampling clock signal MCK. The signal MCK is generated by phase locked loop (PLL) circuitry 440.

The circuitry 440, which may be a conventional burst-locked PLL is a responsive to the main chrominance signal component, MC, and to the main burst-gate signal, MBG, to generate the clock signal MCK which has a frequency, 4fc, four times the frequency, fc, of the color subcarrier signal component of the signal MCV. The signal MCK is locked in phase to the color synchronizing burst signal component of the main signal MCV.

The color burst signal is a reference signal having a predetermined phase relationship with the color subcarrier signal component of a composite video signal. Thus, the ADC 424 produces samples of the auxiliary signal, XCV, which are sampled in synchronism with the chrominance subcarrier signal component of the main signal, MCV.

The samples provided by the ADC 424 are applied to auxiliary timing circuitry 426 which, responsive to the signal MCK, generates signals AVS, ABG, AU, AS and NL. The signal AVS is the vertical field synchronizing signal for the auxiliary video signal. The signal ABG is the auxiliary burst-gate signal. The signal AU indicates when the auxiliary samples are from an upper field or from a lower field. The signals AS and NL are pulse signals that indicate which pixels and lines, respectively, of the auxiliary signal may be used to form the compressed image. These signals eliminate several lines on the top and bottom of the image and several pixel positions on the left and right sides of the image. These portions of the image are eliminated to reduce the amount of memory used to store the image and to reduce the size of the small picture.

The samples generated by the ADC 424 are applied to a luminance-chrominance (Y/C) separator and chrominance signal demodulator 428, which is also coupled to receive the signal ABG provided by the auxiliary timing circuitry 426. The Y/C separator portion of the circuitry 428 uses, for example, a low-pass and band-pass filter arrangement to separate luminance signal and chrominance-band signals from the auxiliary video signal. The chrominance signal demodulator portion of this circuitry separates the chrominance band signal into two quadrature phase related color difference signals, for example, (R-Y) and (B-Y). Since the signal XCV is sampled synchronous with the color subcarrier signal of the main signal, the color difference samples provided by the circuitry 428 may need to be shifted in phase to correct for phase differences between the color subcarrier signals of the main and auxiliary video signals. To this end, the circuitry 428 is coupled to receive the auxiliary burst-gate signal, ABG, provided by the timing circuitry 426. Responsive to this signal, the circuitry 428 monitors the color burst signal component of the sampled data auxiliary signal and corrects the phase of the demodulated color difference signals to adjust the phase of the auxiliary burst to be the burst reference phase [i.e. $-(B-Y)$].

The output signal of the Y/C separator and chrominance demodulator 428 is applied to a sample formatter 430. The formatter 430 is responsive to the signal AS to horizontally subsample the sampled data luminance signal in a six to one ratio and to subsample each of the sampled data color difference signals to produce one pair of color difference sample values in 36 clock periods. This subsampling horizontally compresses the auxiliary image in a three to one ratio when the luminance samples are displayed with a sampling rate of CK/2 and the color difference samples are displayed at an effective rate of CK/12. One pair of color difference signal samples is produced for each six luminance samples that are produced. The formatter 430 reduces each of the luminance and color difference samples to six bits of significance and combines the luminance and color difference samples such that six bits of each eight-bit sample represent luminance information and the remaining two bits represent one bit each of two corresponding color difference signal samples. This technique spreads each pair of color difference samples across six consecutive luminance samples. The sample formatter 430 provides these eight-bit samples to a buffer 432.

Samples provided to the buffer 432 are stored in a first-in-first-out (FIFO) memory (shown in FIG. 7) which is internal to the buffer 432. From the buffer 432, the stored samples are transferred to a memory 436 under control of memory address generation circuitry 434. The circuitry 434 also controls the reading of samples from the memory 436 for display. In writing samples into the memory 436, the circuitry 434 vertically subsamples the horizontally subsampled auxiliary signal to generate samples representing a vertically and horizontally compressed image. The buffer 432 is described below in reference to FIG. 7 and the memory address generation circuitry 434 is described below in reference to FIGS. 5 and 6. The memory 436 used in this embodiment of the invention has 8,192 (8K) eight-bit storage locations. The memory is organized as a main section having 7,451 eight-bit storage cells. This section holds 69 lines samples each of which includes 108 bytes. These 69 lines of samples define a field of the compressed image. In addition, the memory 436 includes two crossover buffers, each having 108 eight-bit storage cells. The crossover buffers are used to ensure that each displayed line includes samples from one type of field.

Samples are read from the memory 436 at a 2fc rate responsive to the address signals provided by the memory address generator 434. These samples are processed by the circuitry described below to generate the composite video signal ACV which is combined with the signal MCV, as set forth above, to generate the compound pix-in-pix image. The samples read from the memory 436 are applied to a sample formatter 438. The formatter 438 reverses the process performed by the formatter 430, to provide separate luminance and color difference sampled data signals, each occurring at a 4fc sample rate. However, in this embodiment of the invention, the luminance samples change value at a maximum rate of 2fc and the color difference samples change at a maximum rate of fc/3. The sampled data $(R-Y)$ and $(B-Y)$ color difference signals are applied to a chrominance signal encoder 450 which interleaves interpolates and selectively inverts the color difference samples to generate a sampled data chrominance signal. The effective color subcarrier signal of this sampled data chrominance signal has the same frequency and phase as the color subcarrier of the signal MCV, since the clock signal, MCK, used by the encoder 450 is burst-locked to the main signal.

A signal DM, provided by the pix-in-pix insertion circuitry 420, is concatenated to the MSB position of the sampled data luminance signal, YA, provided by the formatter 438 and the combined signals are applied to the clock transfer circuitry 446. The circuitry 446 changes the timing of the signal DM and of the luminance samples to generate respective signals DM' and YA' which are synchronous with the clock signal YCK. As set forth above, the signal DM' controls the insertion of auxiliary image information into selected line intervals of the main signal. The signal YCK is phase aligned to a horizontal scanning signal that is used to display the main image on the CRT 418. This alignment of the signals DM' and YA' prevents skew errors which may cause vertical edges in the compressed image to appear jagged. Clock phase shifting circuitry 442 generates the clock signal YCK by providing multiple phases of the signal MCK and then selecting one of these phases as the signal YCK. The selected phase is the one most closely aligned to a horizontal line scanning reference signal derived from the signal MCB. As set forth above, the signal MCB is generated by the synchronizing signal separation circuitry 412.

The signal YA' provided by the clock transfer circuitry 446 and the signal C provided by the chrominance signal encoder 450 are applied to respective digital-to-analog converters 448 and 452 which generate analog signals corresponding to the respective sampled data digital signals. These analog signals are combined in summing circuitry 454 to generate the analog composite video signal ACV which is substituted for a portion of the main signal MCV to generate the compound composite video signal, CCV.

Instead of multiplexing the signals MCV and ACV to develop signals representing the compound image, it is contemplated that circuitry may be inserted in the analog decoder 416 to multiplex the signals YA' and CA with respective separated main luminance and chrominance signals. Moreover, it is contemplated that other component signals such as YA' and $(R-Y)A$ and $(B-Y)A$ or auxiliary R, G, and B primary color signals may be multiplexed with corresponding signals derived from the main video signal to generate signals representing the compound image.

As set forth above, the compressed inset image may be distorted due to timing differences between the vertical field and horizontal line synchronizing signal components of the main and auxiliary video signals. The memory address generation circuitry 434 compensates for these timing differences to reduce the distortion of the compressed image.

Figure 5:
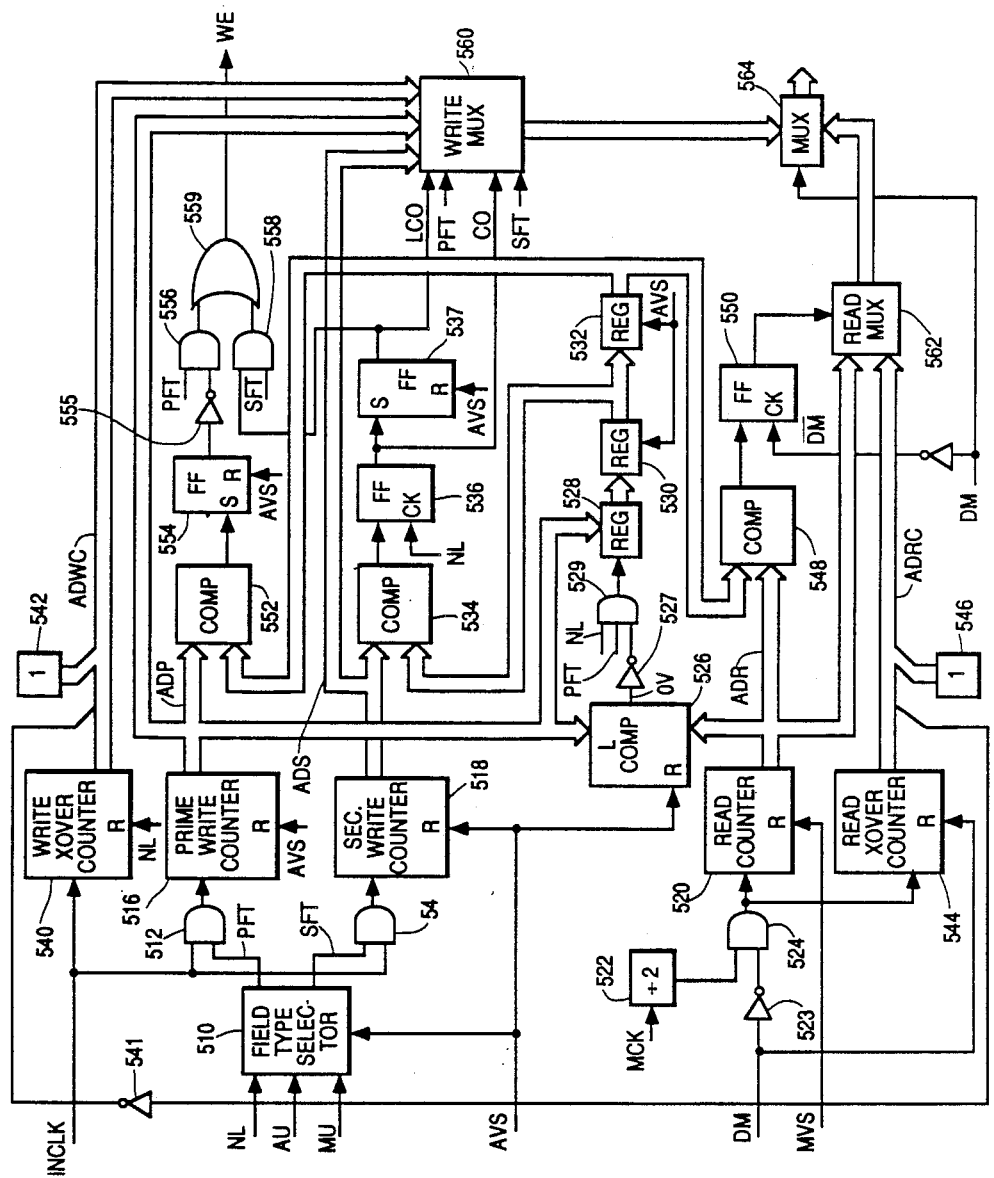
FIG. 5 is a block diagram of a memory address generator suitable for use in the television receiver shown in FIG. 4.
Figure 6:
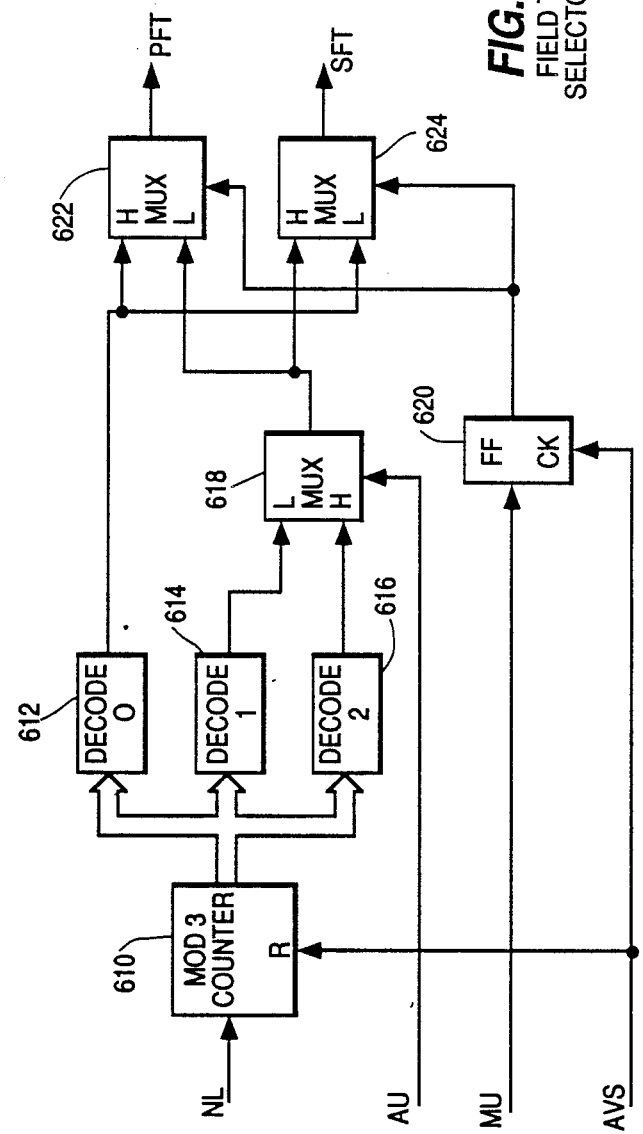
FIG. 6 is a block diagram of a field-type selector suitable for use in the memory address generator shown in FIG. 5.

FIGS. 5 and 6 are block diagrams of exemplary memory address generation circuitry 434. The circuitry 434 generates both the read and write address signals for the memory 436. In this embodiment of the invention, the memory 436 is an 8K by eight-bit static random access memory (SRAM), having a single address input port and a single data input/output (I/O) port. Consequently, the read and write addresses are provided via a single bus, and any read-write conflicts are resolved in the address generation circuitry 434.

The function performed by this circuitry 434 may be summarized as follows. For each field of the auxiliary signal a primary field type and a secondary field type are designated. Lines of the primary field type (either upper or lower) are stored in the first part of the field memory 436 and, if there is a crossover during the writing of the compressed field, lines of the secondary field type are stored in the remaining cells of the memory.

Ideally, no crossover occurs and the primary field type matches the field type of the main image in which the compressed image is displayed. However, if a crossover does occur, the address generation circuitry 434 determines the line address in each field interval at which crossover is likely to occur and, for the samples of this line, generates separate read and write addresses corresponding to respective crossover buffers. The crossover buffers used for reading and writing alternate from field to field.

FIG. 5 is a block diagram of circuitry suitable for use as the address generation circuitry 434. Conceptually, this circuitry includes four major components, a field type selector 510, a primary write address counter 516, a secondary write address counter 518 and a read address counter 520. The field type selector determines, from the signals NL, AVS, AU and MU, the field types of the primary and secondary fields of the compressed image and generates signals indicating when lines of auxiliary samples of the appropriate field type are available. The primary and secondary write address counters provide write addresses timed to coincide with samples of the primary and secondary field types. The read address counter provides memory addresses timed to coincide with the display interval for the compressed image.

In FIG. 5, the field type selector 510 is responsive to the signals NL, AU and MU as well as to the auxiliary vertical field synchronization signal AVS for generating signals PFT and SFT which indicate when the primary field counter 516 and secondary field counter 518 are to be activated. The signal NL indicates the beginning of a new line in the portion of incoming auxiliary image which is to be displayed. In the present embodiment, this portion corresponds to the central 207 lines of the 243 active lines in each field of the auxiliary image.

Exemplary circuitry for the field type selector 510 is shown in FIG. 6. In FIG. 6, The signal NL is applied to a modulo three counter 610. Three decoders, 612, 614 and 616 are coupled to the output port of the counter 610. These decoders generate logic-one output signals which span a horizontal line interval when the value provided by the counter 610 is zero, one and two, respectively. The decoders 614 and 616 are coupled to a multiplexer 618 which is controlled by the signal AU. When the signal AU has a logic-one value, indicating that the auxiliary signal is for an upper field, the multiplexer 618 is conditioned to pass the signal provided by the decoder 616. Otherwise, the multiplexer 618 passes the signal provided by the decoder 614. The multiplexer 618 provides an indication of which line of the three line set is to be used to produce a lower compressed field. The output of the decoder 612 indicates which line is to be selected to produce an upper compressed field. The signals provided by the multiplexer 618 and decoder 612 are valid when the received auxiliary field is an upper field or a lower field. This method of selecting lines to be used for upper and lower fields of the compressed image is illustrated in FIG. 2, described above.

The output signals of the decoder 612 and the multiplexer 618 are coupled to respective first and second input terminals of a multiplexer 622 and to respective second and first input terminals of a multiplexer 624. The multiplexers 622 and 624 are controlled by the output signal of a D-type flip-flop 620 which has the signal MU applied to its data input terminal and the signal AVS applied to its clock input terminal. The signal MU has a value of logic-one when the main signal is an upper field signal and a value of logic-zero, otherwise. The state of the flip-flop 620 is determined at the start of an auxiliary field and does not change until the start of the next auxiliary field. The output signal of the flip-flop 620 determines the primary and secondary field types.

When the flip-flop 620 has a logic-one state (i.e. when the primary field type is upper), the multiplexers 622 and 624 are conditioned to pass the signals provided by the decoder 612 and multiplexer 618, respectively. These signals are reversed when the flip-flop 620 has a logic-zero state (i.e. when the primary field type is lower). The output signal, PFT, of the multiplexer 622 has a logic-one value only when lines of samples of the primary auxiliary field type are available at the output of the sample formatter 430. Conversely, the output signal, SFT, of the multiplexer 624 has a logic-one value only when lines of samples of the secondary field type are available.

Referring to FIG. 5, the signal PFT is applied to one input terminal of an AND gate 512 and the signal SFT is applied to one input terminal of an AND gate 514. Second input terminals of each of the AND gates 512 and 514 are coupled to receive a signal INCLK which is generated by the buffer 432, described below in reference to FIG. 7. The signal INCLK is pulsed each time a sample is available in the buffer 432 for transfer to the memory 436. When sample values are being read from the memory 436, the signal INCLK is disabled.

The output signals of the AND gates 512 and 514 are applied to the clock input terminals of the respective 13-bit counters 516 and 518. The counter 516 provides an output signal, ADP, which is a stream of address values that may be used to write samples of the primary field type into the memory 436. The counter 518 provides an output signal, ADS, which is a stream of address values that may be used to write samples of the secondary field type into the memory 436. These signals are applied to separate input ports of a multiplexer 560. A third input signal applied to the multiplexer 560 is a crossover write address signal, ADWC which is generated by a counter 540 an inverter 541 and a source of digital constant value 542 as set forth below.

The read-address counter 520 is a 13-bit counter which is clocked by the logical AND of an inverted version of the signal DM and a signal generated by halving the frequency of the clock signal MCK. The output signal of the counter 520 is a read address signal, ADR. The counter 520 is reset by the main vertical field synchronizing signal, MVS. The signal ADR and a crossover read address signal ADRC are applied to a multiplexer 562 which produces a read address output signal. The crossover read address signal, ADRC, is generated by a counter 544 and digital value source 546 as set forth below.

The write address signal provided by the multiplexer 560 and the read address signal provided by the multiplexer 562 are applied to respectively different signal input ports of a multiplexer 564. The multiplexer 564 is controlled by the signal DM generated by the pix-in-pix insertion timing circuitry 420 to provide read addresses when the compressed image is to be displayed and to provide write addresses otherwise.

As set forth above, crossover occurs when the read address value matches the write address value. Samples in the memory having addresses less than the crossover address are displayed in one field and samples having addresses greater than the crossover address are displayed in the next subsequent field. The image may be distorted if the field types of these samples are not controlled or if samples of two different field types are mixed on a single line.

To ensure that all of the samples on a given line are of one field type, this embodiment of the invention includes two crossover buffers. As set forth above, these buffers are implemented as a part of the memory 436. The starting addresses of the first and second buffers are 8064 (1F80 hexadecimal) and 7936 (1F00 hexadecimal). The address signals for writing into the crossover buffers are generated by the counter 540 and digital value source 542. The counter 540 is a seven-bit counter which is reset by the new line signal NL and clocked by the signal INCLK. The output signal of this counter forms the seven least significant bits (LSB's) of the write address signal. The next more significant bit of the address signal is an inverted version of the signal MU provided by the inverter 541. The five most significant bits (MSB's) of the crossover buffer write address are logic-ones, provided by the digital value source 542. The signal MU alternates the crossover address signal between the two crossover buffers for alternate fields of the main signal. Similar circuitry is used to generate the read crossover address signal, ADRC. The only differences between this circuitry and the circuitry described above are that the signal MU is used directly to form the eighth bit of the address signal and the counter 544, which corresponds to the counter 540, is reset by the signal DM and clocked by the clock signal for the counter 520.

The circuitry shown in FIG. 5 uses the crossover buffers by first determining the starting address of the crossover lines in each field of the signal. For a given field, the address generation circuitry 434 conditions the memory 436 to store the entire line in which the crossover occurs in one of the crossover buffers while the crossover line for the previous field is read from the other buffer.

The crossover line address for a field is determined as follows. Responsive to the signals NL and PFT applied to an AND gate 529, the seven most significant bits (MSB's) of the starting address of each primary line are stored in a register 528. The AND gate 529 is disabled by a crossover signal provided by an inverter 527. The generation of this signal is described below. When the AND gate 529 is disabled, no new address values are stored in the register 528. Consequently, at the end of each field, the register 528 holds the seven MSB's of the starting address of the primary-field line in which crossover occurred.

The register 528 is the first of three cascade connected seven-bit parallel-input, parallel-output registers. The register 528 is clocked by the output signal of the AND gate 529, while the other two registers, 530 and 532 are clocked by the signal AVS. In this configuration, the value held in the register 530 is the crossover line address from the previous field and the value held in the register 532 is the crossover line address from two fields (one frame) previous. These values are referred to as the field delayed and frame delayed crossover addresses, respectively.

The crossover event which disables the AND gate 529 is detected by comparing, in a latching comparator 526, the eight MSB's of the read address value provided by the counter 520 to the eight MSB's of the primary write address value, ADP, provided by the counter 516. When these read and write addresses are equal, an output signal, OV, of the comparator 526 changes from logic-zero to logic-one and remains at logic-one until the comparator is reset by the signal AVS. Responsive to the signal OV, the inverter 527 disables the AND gate 529 as set forth above.

Since the vertical field scanning signal component of a television signal is nominally at fixed frequency (for example 59.94 Hz in the NTSC system), the crossover address, which is a measure of the phase difference between the vertical scanning signal components of the main and auxiliary signals, should not change significantly from frame to frame. In this embodiment of the invention, the seven-bit frame-delayed crossover line address provided by the register 532 is compared to the seven MSB's of the primary address, ADP, by a comparator 552 to determine when a line of samples is to be written using the crossover write address signal, ADWC. The output signal of the comparator 552 is coupled to the set input of an S—R flip-flop 554. The reset input of the flip-flop 554 is coupled to receive the signal AVS. In this configuration, the output signal of the flip-flop 554 is logic-zero from the start of an auxiliary field until the primary write counter value exceeds the frame delayed crossover address, and is logic-one from then until the end of the auxiliary field.

The secondary address signal, ADS is compared, in a comparator 534 to the field delayed crossover address provided by the register 530. The output signal of the comparator 534 is stored in a flip-flop 536 at the start of each line of compressed samples. The output signal, CO, of the flip-flop 536 is applied to the set input terminal of an S—R flip-flop 537 which is reset by the signal AVS. The output signal, CO, of the flip-flop 536 is logic-one for the duration of secondary crossover line and is logic-zero otherwise. The output signal, LCO, of the flip-flop 537 is logic-zero from the start of an auxiliary field until the secondary crossover line address is encountered and is logic-one from the start of the secondary crossover line to the end of the auxiliary field.

The signals CO, LCO, PFT and SFT are applied to the multiplexer 560 to select one of the address signals ADP, ADS or ADWC as the write address signal to apply to the memory 436. The primary address signal ADP is selected when the signal PFT is logic-one and the signal LCO is logic zero. The secondary address signal ADS is selected when the signals SFT and LCO are both logic-one. The signal ADWC is selected when the signal CO is logic-one.

This method for switching among the signals ADP, ADS and ADWC may, in some instances produce erroneous write address values. This occurs when the frame-delayed (primary) crossover address value is less than the field (secondary) delayed value. In this instance, the primary address signal, ADP, may be provided during the primary crossover line interval, that is to say, after the primary crossover event has occurred but before the secondary crossover event occurs. As set forth above, no samples are written using, ADP, during the primary crossover line interval. This error is corrected, as set forth below, by holding a write enable signal, WE, in a logic-zero state during the primary crossover line interval to disable any write operation into the memory 436 during this interval.

The signal WE is generated by an inverter 555, two AND gates 556 and 558 and an OR gate 559. This signal is a logic-one when a line from a primary field is provided (PFT is logic-one) and the primary crossover has not occurred or when a line from a secondary field is provided (SFT is logic-one) and the secondary crossover has occurred. Otherwise, the signal WE is logic-zero.

The memory read address is switched between the read address signal ADR provided by the counter 520 and a crossover read address signal ADRC provided by the counter 544 and digital value source 546. The read crossover event is detected by a comparator 548 which compares the seven MSB's of the signal ADR with the seven-bit frame delayed crossover address value provided by the register 532. The comparator 548 produces a logic-one output signal when these two signals have equal values. The signal produced by the comparator 548 is stored in a flip-flop 550 synchronous with a positive-going transition of the signal $\overline{DM}$.

The output signal of the flip-flop 550 conditions the multiplexer 562 to provide the signal ADR for each line except the crossover line. During the crossover line interval, the multiplexer 562 is conditioned to provide the signal ADRC as the read address signal. In any given field, field-delayed data is read from one of the crossover buffers while data from the current field is written into the other buffer.

The write address signal provided by the multiplexer 560 and the read address signal provided by the multiplexer 562 are applied to respective input ports of a multiplexer 564. The multiplexer 564 is controlled by the signal DM generated by the pix-in-pix insertion timing circuitry 420. When the signal DM is logic-zero, the compressed auxiliary signal is inserted into the main signal and the multiplexer 564 is conditioned to provide read address values. When the signal DM is logic-one, the auxiliary signal may be written into the memory 436 and the multiplexer 564 is conditioned to provide write address values.

Figure 7:
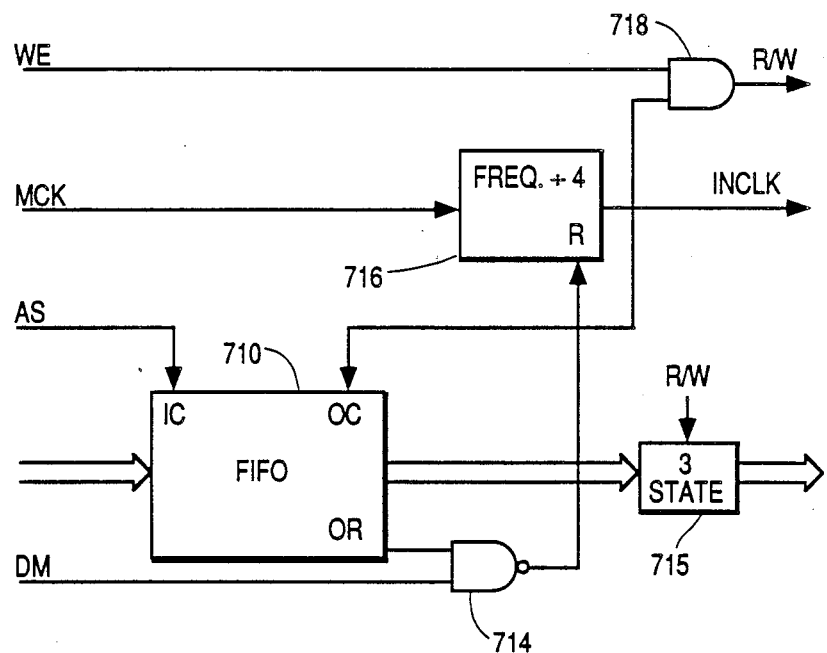
FIG. 7 is a block diagram of buffer circuitry suitable for use in the television receiver shown in FIG. 4.

Referring to FIG. 4, write address values are provided by the memory address generator 434 in response to the signal INCLK produced by the buffer circuitry 432. Each pulse of the signal INCLK increments one or more of the counters 516, 518, and 540, shown in FIG. 5, which generate the write address signals that are applied to the memory 436. FIG. 7 is a block diagram of circuitry suitable for use as the buffer 432.

In FIG. 7, the horizontally compressed and formatted sampled data video signal provided by the sample formatter 430 is applied to the input port of a FIFO memory 710. The FIFO 710 has an input clock terminal, IC, which is coupled to receive the pixel clock signal AS. As set forth above, the signal AS has a nominal frequency, $\frac{8}{3}f_c$, two-thirds times the frequency, $f_c$, of the color subcarrier signal, one-sixth of the frequency of the 4fc clock signal, MCK. The signal AS defines the rate at which samples are written into the FIFO 710. Samples are read from the FIFO 710 in response to the clock signal INCLK which is generated by a frequency divider circuit 716. A reset input terminal, R, of the circuit 716 is coupled to receive the logical NAND of the signal DM and an output ready signal, OR, provided by the FIFO 710. When this reset input signal is logic-zero, the signal INCLK has a frequency, fc, which is one-fourth of the frequency of the signal MCK. When a logic-one is applied to the reset input, the signal INCLK is disabled. The frequency divider 716 is reset by a signal provided by a NAND gate 714.

The output ready signal, OR, provided by the FIFO 710 is a logic-one only when the FIFO contains valid samples, that is to say when samples have been written into the FIFO synchronous with the signal AS but have not yet been read from the FIFO. Samples are provided to the FIFO 710 at a rate one-sixth of the frequency of the signal MCK. When the signal DM is logic-one and the auxiliary image is not being displayed, these samples are read from the FIFO as quickly as they are provided. Thus, in this instance, the effective frequency of the signal INCLK is also one-sixth of the frequency of the signal MCK. However, when the signal DM is logic-zero, the signal INCLK is disabled and samples are allowed to accumulate in the FIFO 710. At the end of a displayed line of the compressed image, the signal DM again becomes logic-one, enabling the signal INCLK. The signal INCLK then transfers the held data out of the FIFO 710 to the memory 436 at a rate of one-fourth the frequency of the signal MCK until the FIFO is emptied. This transfer mechanism is sufficient to ensure that all of the samples which were held in the FIFO while the memory 436 was being read may be written into the memory before the start of the next auxiliary line interval.

Since the write address values provided by the address generator 434 change synchronous with the signal INCLK, these write address values track the frequency changes in the signal INCLK so that the proper sample values are written into the proper memory locations.

The read address values produced by the address generator 434 change with a frequency that is one-half of the frequency of the signal MCK. However, sample values are read from the memory 436 synchronous with the signal MCK. Thus, every sample provided by the memory 436 is displayed twice. This produces an effective horizontal compression ratio of three-to-one in the displayed image, matching the three-to-one vertical compression ratio produced by the address generator 434.

While the invention has been described in terms of an exemplary embodiment, it is contemplated that it may be practiced as outlined above with modifications within the spirit and scope of the appended claims.

What is claimed is:

1. In a system for concurrently displaying first and second video images derived from respective first and second mutually asynchronous video signals, each of said video signals being divided into a succession of field intervals, each field interval including a sequence of line intervals, means for synchronizing the display of the second video signal to the first video signal, comprising:

signal storage means including:
   main memory means including a sufficient amount of memory to hold one field interval of the second video signal; and
   crossover memory means including an amount of memory sufficient to hold one line interval of said second video signal;
   signal processing means for storing said second video signal in said signal storage means and for retrieving said stored video signal from said signal storage means comprising:

monitoring means, coupled to said signal processing means, for generating a control signal when an overlap is detected between the signal being stored in said main memory means and the signal being retrieved from said main memory means, and for determining in which line interval of said second signal said overlap occurs; and signal routing means, for writing said second video signal to said main memory means and responsive to said control signal for writing at least a portion of said line interval of said second video signal determined by said monitoring means into said crossover memory means.

2. The system set forth in claim 1, wherein:

said crossover memory means includes first and second crossover buffer means, each including an amount of storage sufficient to hold one line interval of said second video signal;

said signal routing means includes means for writing the determined line interval of said second video signal alternately to said first and second crossover buffer means during respective alternate field intervals of said second video signal; and said signal processing means includes means for retrieving lines of said stored second video signal from said main memory means and alternately from said respective second and first crossover buffer means during respective alternate field intervals of said first video signal.

3. A system for displaying a compound image representing combined first and second full motion images derived from respective first and second mutually independent video signals, wherein each of said first and second video signals is divided into a sequence of field intervals and consecutive ones of said field intervals are of alternate upper and lower field types, and each field includes a sequence of line intervals of signal, said system comprising:

memory means, for writing to and reading from, a third video signal and for synchronizing said third video signal with said first video signal;

means, responsive to said first and second video signals, for generating a signal indicating the field type said first video signal will exhibit when signal currently being written to said memory means is subsequently read from said memory means;

means, responsive to said second video signal, for deriving said third video signal from a first subset of line intervals of said second video signal when said generated signal indicates said first field type and said second video signal exhibits said first field type, and from a second subset of line intervals when said generated signal indicates said second field type and said second video signal exhibits said first field type, and;

means for combining said third video signal from said memory means with said first video signal to form a signal representing said compound image.

4. The system set forth in claim 3 wherein:

said means, responsive to said second video signal, for deriving said third video signal further derives said third signal from a third subset of line intervals of said second video signal when said generated signal indicates said second field type and said second video signal exhibits said second field type and from a fourth subset of line intervals when said generated signal indicates said first field type and said second video signal exhibits said second field type.

5. The system set forth in claim 4 wherein:

said third video signal corresponds to said second video signal compressed in a ratio of three to one;

the line intervals in each field of said second video signal are numbered zero through M, where M is a positive integer;

said first and second subsets include line intervals of the field of said upper type having numbers 3N and (3N+2), respectively, where N is a positive integer not greater than M/3; and said third and fourth subsets include line intervals of the field of said lower type having numbers 3N and (3N+1), respectively.

6. The system set forth in claim 4 wherein:

said second video signal is a sampled data signal and said third signal corresponds to a vertically compressed version of said second video signal;

said memory means includes video signal storage means having a sufficient number of cells to hold one field interval of said vertically compressed second video signal and means, responsive to said first video signal, for reading samples from said sample storage means and for generating a horizontally compressed video signal from said read samples; and said means, responsive to said second video signal, for deriving said third video signal includes sample routing means, responsive to said first video signal having an upper field type, for storing, in said video signal storage means, samples from one of said first and third subsets and responsive to said first video signal having a lower field type for storing, in said video signal storage means, samples from one of said second and fourth subsets.

7. The system set forth in claim 4 wherein:

said memory means includes main memory means having a sufficient number of addressable cells to hold one field interval of said third video signal and crossover buffer means having a sufficient number of cells to hold at least one line interval but significantly less than one field of said third video signal; and sample routing means including:

means for storing successive ones of samples of said third video signal into successive ones of said addressable cells and means for reading successive ones of said stored samples from successive ones of said addressable cells;

monitoring means, coupled to said means for storing, for detecting coincidence of the two addressable cells used, respectively, for writing samples into the main memory means and for reading samples from the main memory means, and for generating a control signal upon detecting such coincidence; and means, responsive to said control signal for directing said means for storing to store one line interval of sample values in said crossover buffer means.

8. In a system for displaying a compound image representing a full-size, full-motion, first image and a vertically compressed, full-motion, second image derived from respective first and second mutually independent video signals, each of said first and second video signals being divided into a sequence of field intervals and consecutive ones of said field intervals having alternate upper and lower field types, a method for vertically subsampling said second video signal comprising the steps of:

generating, from each field interval of said second video signal, first and second derivative video signals representing respective first and second vertical subsampling phases corresponding, respectively to said upper and lower field types; and combining said first derivative video signal with said first video signal during field intervals of said first video signal having said upper type and combining said second derivative video signal with said first video signal during first video signal field intervals of said lower type to generate a signal representing said compound image.

9. In a system for concurrently displaying main and auxiliary video images derived from respective main and auxiliary mutually independent video signals, each of said video signals occurring in sequences of field intervals of alternate upper and lower field types, each field interval including horizontal lines of video information, apparatus for synchronizing the display of the auxiliary video signal to the main video signal comprising:

means for vertically subsampling said auxiliary video signal in a first predetermined phase relationship with respect to the occurrence of said horizontal lines of said auxiliary video signal, for the field types of the main and auxiliary signal being the same type, and for vertically subsampling said auxiliary video signal in a second predetermined phase relationship with respect to the occurrences of said horizontal lines of said auxiliary video signal for the field types of the main and auxiliary video signals being different; and storage means for storing and retrieving subsampled auxiliary video signal.

* * * * *